(12) United States Patent
Sobel et al.

(10) Patent No.: US 7,549,169 B1
(45) Date of Patent: Jun. 16, 2009

(54) ALTERNATED UPDATE SYSTEM AND METHOD

(75) Inventors: William E. Sobel, Stevenson Ranch, CA (US); Peter Szor, Northridge, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 805 days.

(21) Appl. No.: 10/928,687

(22) Filed: Aug. 26, 2004

(51) Int. Cl.
*G06F 12/14* (2006.01)

(52) U.S. Cl. .............. 726/26; 726/22; 726/24; 726/25; 713/168; 713/188; 709/221; 709/227

(58) Field of Classification Search ............ 726/26
See application file for complete search history.

(56) References Cited

U.S. PATENT DOCUMENTS

| | | | |
|---|---|---|---|
| 5,948,104 A * | 9/1999 | Gluck et al. ............... 726/24 |
| 6,035,423 A * | 3/2000 | Hodges et al. ............. 714/38 |
| 6,199,204 B1 | 3/2001 | Donohue |
| 6,202,207 B1 | 3/2001 | Donohue |
| 6,263,364 B1 | 7/2001 | Najork et al. ............. 709/217 |
| 6,725,377 B1 * | 4/2004 | Kouznetsov .............. 726/23 |
| 6,832,373 B2 | 12/2004 | O'Neill |
| 6,854,074 B2 | 2/2005 | McLellan et al. ......... 714/39 |
| 6,976,271 B1 * | 12/2005 | Le Pennec et al. ........ 726/24 |
| 7,076,655 B2 | 7/2006 | Griffin et al. |
| 7,103,641 B2 | 9/2006 | Brannock |
| 7,149,946 B2 | 12/2006 | Peretz et al. |
| 7,257,841 B2 * | 8/2007 | Naitoh .................... 726/24 |
| 7,290,282 B1 | 10/2007 | Renert et al. ............. 726/24 |
| 2001/0029178 A1 | 10/2001 | Criss et al. |
| 2002/0120725 A1 | 8/2002 | DaCosta et al. |
| 2003/0188160 A1 | 10/2003 | Sunder et al. |
| 2004/0117640 A1 | 6/2004 | Chu et al. ................ 713/188 |
| 2005/0201371 A1 | 9/2005 | Lauer |
| 2006/0075001 A1 | 4/2006 | Canning et al. |
| 2006/0130037 A1 | 6/2006 | Mackay |

OTHER PUBLICATIONS

Bleeping Computer LLC, 'Using Spybot—Search & Destroy to remove Spyware from Your Computer', Bleeping Computer LLC, Mar. 25, 2004, entire document, http://www.bleepingcomputer.com/tutorials/tutorial43.html.*

Safer Networking Ltd, 'How to . . . How to update' web page, 2000-2008,Safer Networking Ltd, entire document and appropriate associated links, http://www.safer-networking.org/en/howto/update.html.*

(Continued)

*Primary Examiner*—Kambiz Zand
*Assistant Examiner*—Ronald Baum
(74) *Attorney, Agent, or Firm*—Gunnison, McKay & Hodgson, L.L.P.; Serge J. Hodgson (57) ABSTRACT

A method includes generating new update name lists and providing malicious code protection update information including the new update name lists to host computer systems. In one embodiment, the new update name lists are generated by registering domain names, and only a subset of the registered domain names are used to create an update name list provided to any one of the host computer systems.

23 Claims, 5 Drawing Sheets

OTHER PUBLICATIONS

Mannan, M., et al, 'Security and Usability: The Gap in Real-World Online Banking', New Security Paradigms Workshop, Oct. 19, 2007, entire document, http://www.scs.carleton.ca/~paulv/papers/nspw07-gap.pdf.*

Bruce McCorkendale et al., U.S. Appl. No. 10/978,051, filed Oct. 29, 2004, entitled "Update Protection System and Method".

"Registering a Domain Name", pp. 1-3 [online]. Retrieved on Aug. 12, 2004. Retrieved from the Internet:<URL:http://www.webopedia.com/DidYouKnow/Internet/2002/DomainRegister.asp>. No author provided.

"DNS", pp. 1-4 [online]. Retrieved on Aug. 10, 2004. Retrieved from the Internet:<URL:http://www.webopedia.com/TERM/d/DNS.html>. No author provided.

"Understanding IP Addressing", pp. 1-3 [online]. Retrieved on Aug. 10, 2004. Retrieved from the Internet:<URL:http://www.webopedia.com/DidYouKnow/Internet/2002/IPaddressing.asp>. No author provided.

"IP address", pp. 1-3 [online]. Retrieved on Aug. 10, 2004. Retrieved from the Internet:<URL:http://www.webopedia.com/TERM/I/IP_address.html>. No author provided.

"domain name", pp. 1-3 [online]. Retrieved on Aug. 10, 2004. Retrieved from the Internet:<URL:http//www.webopedia.com/TERM/d/domain_name.html>. No author provided.

"What is the Hosts file?", pp. 1-2 [online]. Retrieved on May 3, 2004. Retrieved from the Internet:<URL:http://www.accs-net.com/hosts/what_is_hosts.html>. No author provided.

* cited by examiner

ALTERNATED UPDATE SYSTEM AND METHOD

BACKGROUND OF THE INVENTION

1. Field of the Invention

The present invention relates to the protection of computer systems. More particularly, the present invention relates to a method and apparatus for updating malicious code protection information on computer systems.

2. Description of Related Art

Security applications such as anti-virus applications rely upon updates from security vendor update sites. These updates are an essential component of the security applications. For example, as new viruses are created, new virus definitions are distributed as an update to allow for detection of the new viruses.

Recognizing the importance of updates to security applications, new generations of malicious code, e.g., W32.Yaha, W32.Cone, W32.HLLW.Polybot, block access to security vendor update sites by maliciously modifying the hosts file. Specifically, new generations of malicious code manage to block access to update sites by modifying the "hosts" file such that the names used by the security applications to find update sites resolve incorrectly. Usually, names are resolved to addresses using the Domain Name System (DNS); however, the hosts file can be used to override DNS resolution. Thus, malicious code can prevent security applications from obtaining updates through malicious modifications to the hosts file.

If successful in blocking access, the malicious code defeats the ability of the security applications to access and download updates from the security vendor update sites. In this manner, the malicious code reduces or eliminates the effectiveness of the security applications in protecting the host computer system.

SUMMARY OF THE INVENTION

In accordance with one embodiment, a method includes generating new update name lists and providing malicious code protection update information including the new update name lists to host computer systems. In one embodiment, the new update name lists are generated by registering domain names, and only a subset of the registered domain names are used to create an update name list provided to any one of the host computer systems.

The new domain names are registered and new update name lists from these domain names are periodically created and distributed. In this manner, the ability of malicious code to successfully block access to security vendor sites is restricted or defeated.

Specifically, instead of using consistent and hard coded update names that malicious code (or a malicious code creator) can readily discover and maliciously enter into the hosts file to redirect the host computer system back to itself (or any other incorrect IP address), the update names are periodically changed. This essentially eliminates the ability of the malicious code to block a host computer system from accessing and downloading updates from security vendor sites.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

An IP (Internet Protocol) address is an identifier for a computer or device on a TCP/IP (Transmission Control Protocol/Internet Protocol) network. Networks using the TCP/IP protocol route messages based on the IP address of the destination. The format of an IP address is typically a 32-bit numeric address written as four numbers separated by periods. For example, 127.0.0.1 could be an IP address.

However, IP addresses are difficult for humans to remember. Thus, for the convenience of humans, domain names are commonly used instead of IP addresses.

A domain name is a name that identifies one or more IP addresses. For example, the domain name Symantec.com represents one or more IP addresses. The domain names are commonly used in URLs (Uniform Resource Locators) to identify particular web pages. For example, in the URL http://www.Symantec.com/index.html, the domain name is Symantec.com Because the Internet is based on IP addresses, not domain names, every WebServer requires a DNS (domain name system) server to translate domain names into IP addresses. For example, the domain name YourDomain.com might resolve to (translate to) 192.168.150.196.

To allow DNS servers to translate a domain name into an IP address, a domain name must be registered using an accredited registrar. Once registered, the domain name is placed into a domain name database that is used by DNS servers to translate domain names into IP addresses.

More particularly, the host computer generates a DNS query to a DNS server to translate the domain name into the IP address. The response to the DNS query, if successfully resolved, returns the IP address of the host site associated with the domain name.

The "Hosts" file on a host computer allows domain names that are not officially registered with an accredited registrar to be resolved and it allows for an alternate resolution of a registered domain name, i.e., it allows for local override of DNS resolution. On a NT class WINDOWS® operating system, the Hosts file is located in the %System%\drivers\etc\hosts file. On most Unix based systems, the Hosts file is /etc/hosts. A hosts file, or something of similar functionality exists on nearly every operating system.

The hosts file is similar to an address book. The hosts file includes domain names, sometimes called host names, and the associated IP addresses. If the hosts file contains the domain name, the host computer system goes to the host site, i.e., accesses the site specified by the IP address, using the IP address resolved from the hosts file.

Host computers have a host address of their own, it is known as the "localhost" IP address, typically with an IP address of 127.0.0.1. More particularly, a host computer uses the IP address of 127.0.0.1 to refer to itself.

If a domain name of a host site is associated with the localhost IP address (or any other incorrect address for that host site) in the hosts file, the host site is effectively blocked because all attempts to access the host site will lead back to the host computer system (or the other incorrect address). More particularly, the domain name of the host site will be resolved to be the localhost IP address using the hosts file. The host computer will be redirected back to itself instead of to the host site, effectively blocking access to the host site.

Recognizing this usage of the hosts file, malicious code, e.g., worms such as W32.Yaha, W32.Cone, W32.HLLW.Polybot, attempt to maliciously modify the hosts file in an attempt to block access to security vendor sites. If successful in blocking access to security vendor sites, the malicious code defeats the ability of the host computer system, e.g., security applications executing thereon, to access and download updates, sometimes called malicious code protection update information, from the security vendor sites.

For example, the NORTON INTERNET SECURITY™ product includes a LIVEUPDATE™ system that automatically downloads updates, e.g., new virus definitions. The LIVEUPDATE™ system uses URLs that include domain names placed in a default update settings file. For example, the URLs include liveupdate.symantecliveupdate.com and update.Symantec.com/opt/content/onramp.

Malicious code, e.g., W32.HLLW.Polybot, attempt to maliciously modify the hosts file by attempting to add at least the following entries:

127.0.0.1 liveupdate.symantecliveupdate.com; and 127.0.0.1 update.Symantec.com;

in an attempt to block the LIVEUPDATE™ system from automatically downloading updates from liveupdate.symantecliveupdate.com and update.Symantec.com.

For example, assume the case where malicious code is successful in maliciously modifying the hosts file to add the entries:

127.0.0.1 liveupdate.symantecliveupdate.com; and 127.0.0.1 update.Symantec.com.

In this example, when the LIVEUPDATE™ system goes to download updates from liveupdate.symantecliveupdate.com, the host computer system is redirected back to itself thus defeating the download. The LIVEUPDATE™ system then attempts to download updates from update.Symantec.com as an alternative to liveupdate.symantecliveupdate.com. Again, the host computer system is redirected back to itself thus defeating the download. As a net result, the host computer system is unable to download the updates.

Although specific examples of blocking access to a host site by using the localhost IP address of 127.0.0.1 are set forth herein, any IP address that does not map to the host site, sometimes called a misleading IP address, can be inserted in the hosts file to block access. More particularly, instead of downloading updates, the host computer system is redirected to the misleading IP address thus defeating the download. For example, a misleading IP address of 0.0.0.0 is sometimes used by malicious code.

Figure 3:
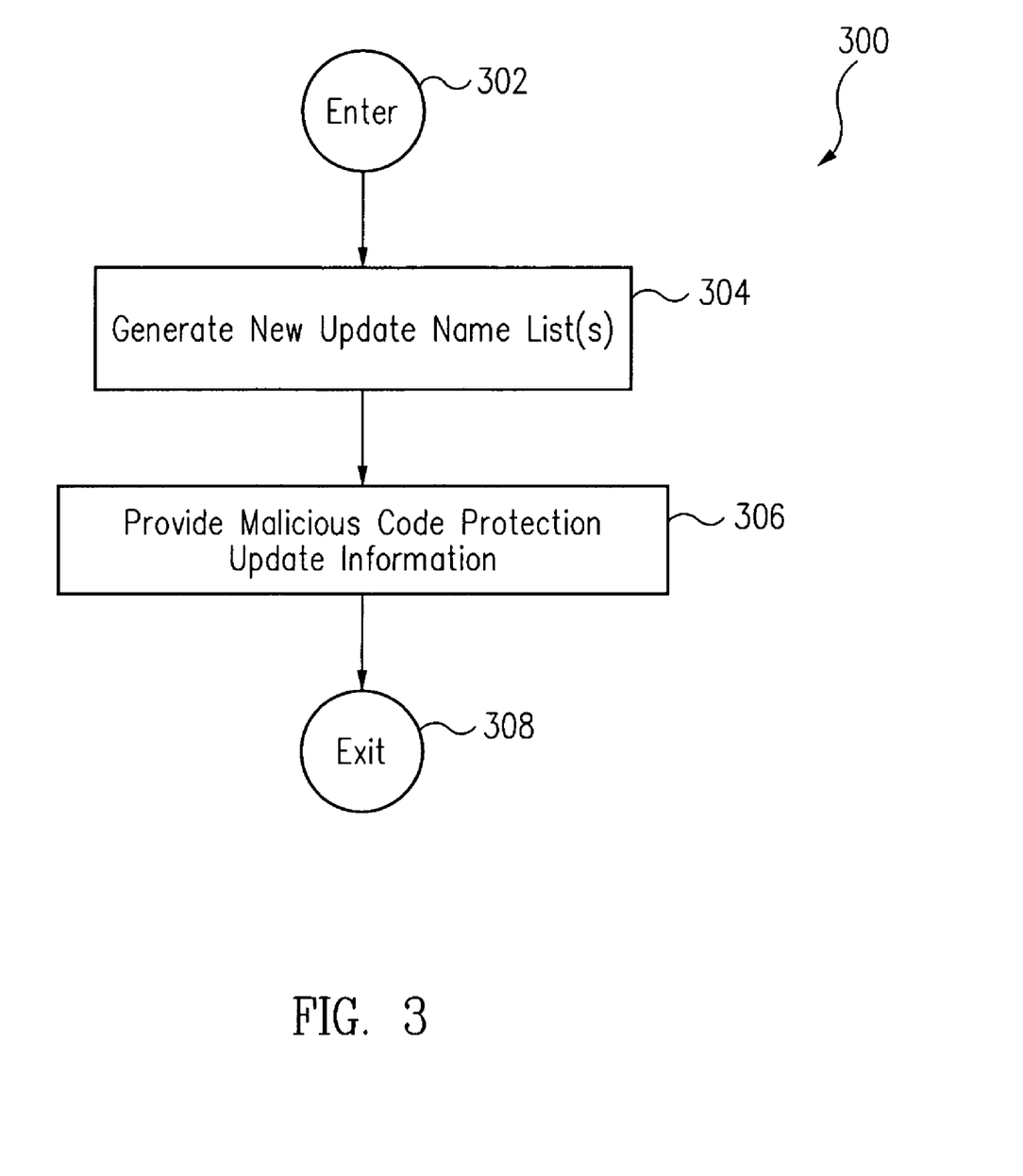
FIG. 3 is a flow diagram of a malicious code protection update information server computer process in accordance with one embodiment of the present invention.

Thus, referring to FIG. 3, a method includes generating new update name lists in a GENERATE NEW UPDATE NAME LIST(S) OPERATION 304 and providing malicious code protection update information including the new update name lists to host computer systems in a PROVIDE MALICIOUS CODE PROTECTION UPDATE INFORMATION OPERATION 306. In one embodiment, the new update name lists are generated by registering domain names, and only a subset of the registered domain names are used to create an update name list provided to any one of the host computer systems.

The new domain names are registered and new update name lists from these domain names are periodically created and distributed. In this manner, the ability of malicious code to successfully block access to security vendor sites is restricted or defeated.

Specifically, instead of using consistent and hard coded update names that malicious code (or a malicious code creator) can readily discover and maliciously enter into the hosts file to redirect the host computer system back to itself (or other incorrect address), the update names are periodically changed. This essentially eliminates the ability of the malicious code to block a host computer system from accessing and downloading updates from security vendor sites.

Figure 1:
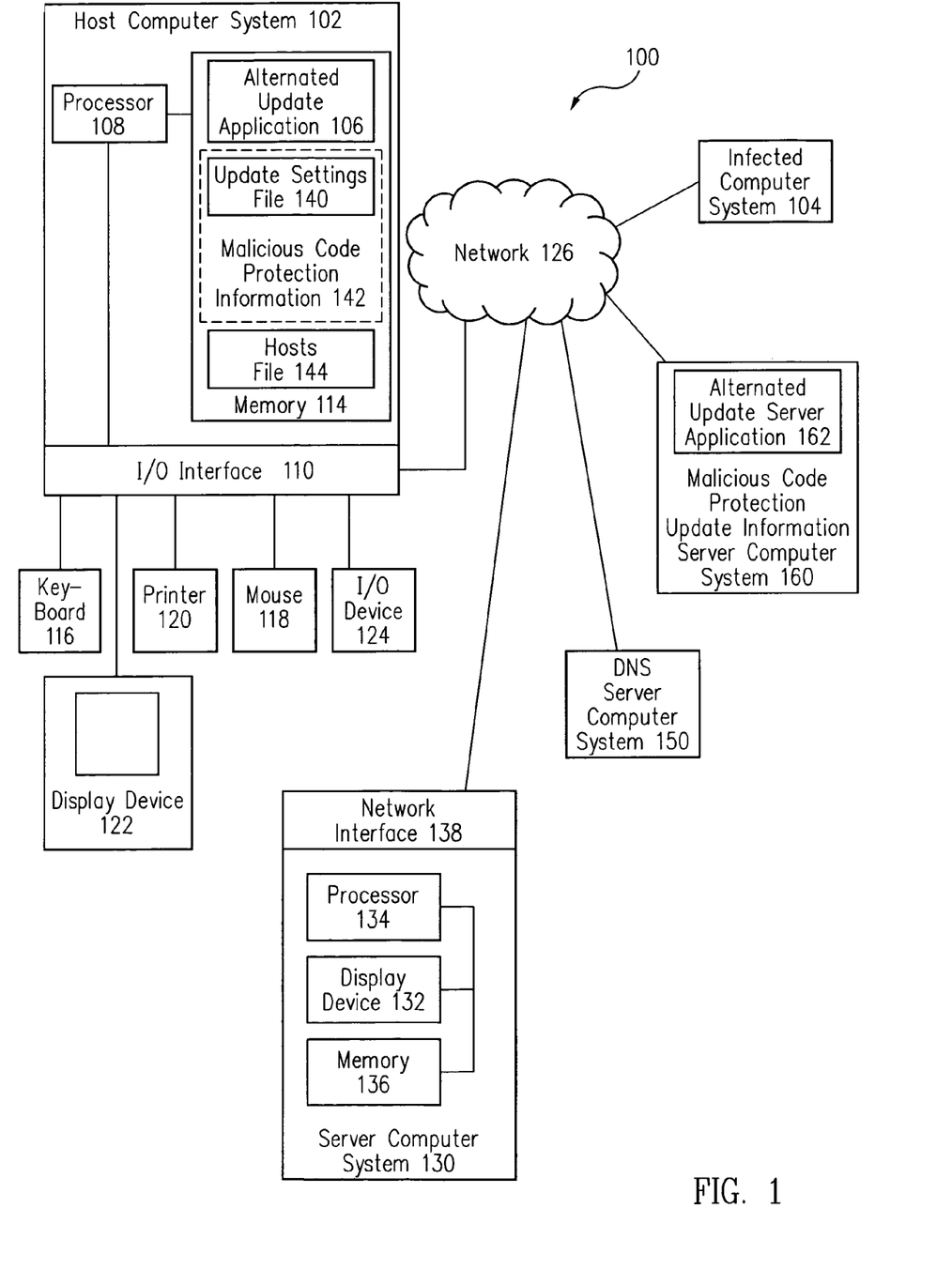
FIG. 1 is a diagram of a client-server system that includes an alternated update application executing on a host computer system and an alternated update server application executing on a malicious code protection update information server computer system in accordance with one embodiment of the present invention.

More particularly, FIG. 1 is a diagram of a client-server system 100 that includes an alternated update application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, host computer system 102 includes a Windows® operating system.

Memory 114 includes malicious code protection information 142. Malicious code protection information 142 includes an update settings file 140. Update settings file 140 includes update settings, i.e., settings for updating malicious code protection information 142 on host computer system 102. In one embodiment, the update settings and thus update settings file 140 include at least one update name, e.g., includes a single update name or an update name list. An update name is a domain name of a site, e.g., a web site or ftp site, from which malicious code protection update information can be obtained.

Malicious code protection information 142 includes malicious code protection information, e.g., virus definitions, in addition to update settings file 140 in one embodiment. Malicious code protection update information is information for updating malicious code protection information on a host computer system. For example, malicious code protection information 142 on host computer system 102 includes virus definitions and an update name list, and malicious code protection update information includes updated virus definitions and a new update name list, which will replace (update) the outdated virus definitions and update name list of malicious code protection information 142.

In one embodiment, malicious code protection information 142 including update settings file 140 are part of alternated update application 106 or other security vendor product(s) of host computer system 102.

Memory 114 further includes a hosts file 144. Hosts file 144 includes domain names, sometimes called host names, and the associated IP addresses. Hosts files such as hosts file 144 are well known to those of skill in the art and so are not discussed further to avoid detracting from the principals of the invention.

Host computer system 102 may further include standard devices like a keyboard 116, a mouse 118, a printer 120, and a display device 122, as well as, one or more standard input/ output (I/O) devices 124, such as a compact disk (CD) or DVD drive, floppy disk drive, or other digital or waveform port for inputting data to and outputting data from host computer system 102. In one embodiment, alternated update application 106 is loaded into host computer system 102 via I/O device 124, such as from a CD, DVD or floppy disk containing alternated update application 106. Further, malicious code protection information 142 is initially loaded into host computer system 102 via I/O device 124 and then updated from a malicious code protection update information server computer system 160 in one embodiment.

Host computer system 102 is coupled to a server computer system 130 of client-server system 100 by a network 126. Server computer system 130 typically includes a display device 132, a processor 134, a memory 136, and a network interface 138.

Further, host computer system 102 is also coupled to an infected computer system 104, malicious code protection update information server computer system 160, and a DNS server computer system 150 by network 126. In one embodiment, infected computer system 104, malicious code protection update information server computer system 160, and DNS server computer system 150 are similar to host computer system 102 and/or server computer system 130, for example, include a central processing unit, an input output (I/O) interface, and a memory.

Infected computer system 104, malicious code protection update information server computer system 160, and DNS server computer system 150 may further include standard devices like a keyboard, a mouse, a printer, a display device and an I/O device(s). The various hardware components of infected computer system 104, malicious code protection update information server computer system 160, and DNS server computer system 150 are not illustrated to avoid detracting from the principles of the invention.

Illustratively, malicious code is propagated from infected computer system 104 to host computer system 102. In one embodiment, malicious code is defined as any computer program, module, set of modules, or code that enters a computer system without an authorized user's knowledge and/or without an authorized user's consent.

Network 126 can be any network or network system that is of interest to a user. In various embodiments, network interface 138 and I/O interface 110 include analog modems, digital modems, or a network interface card.

Alternated update application 106 is stored in memory 114 of host computer system 102 and executed on host computer system 102. The particular type of and configuration of host computer system 102, infected computer system 104, malicious code protection update information server computer system 160, DNS server computer system 150, and server computer system 130 are not essential to this embodiment of the present invention.

Figure 2:
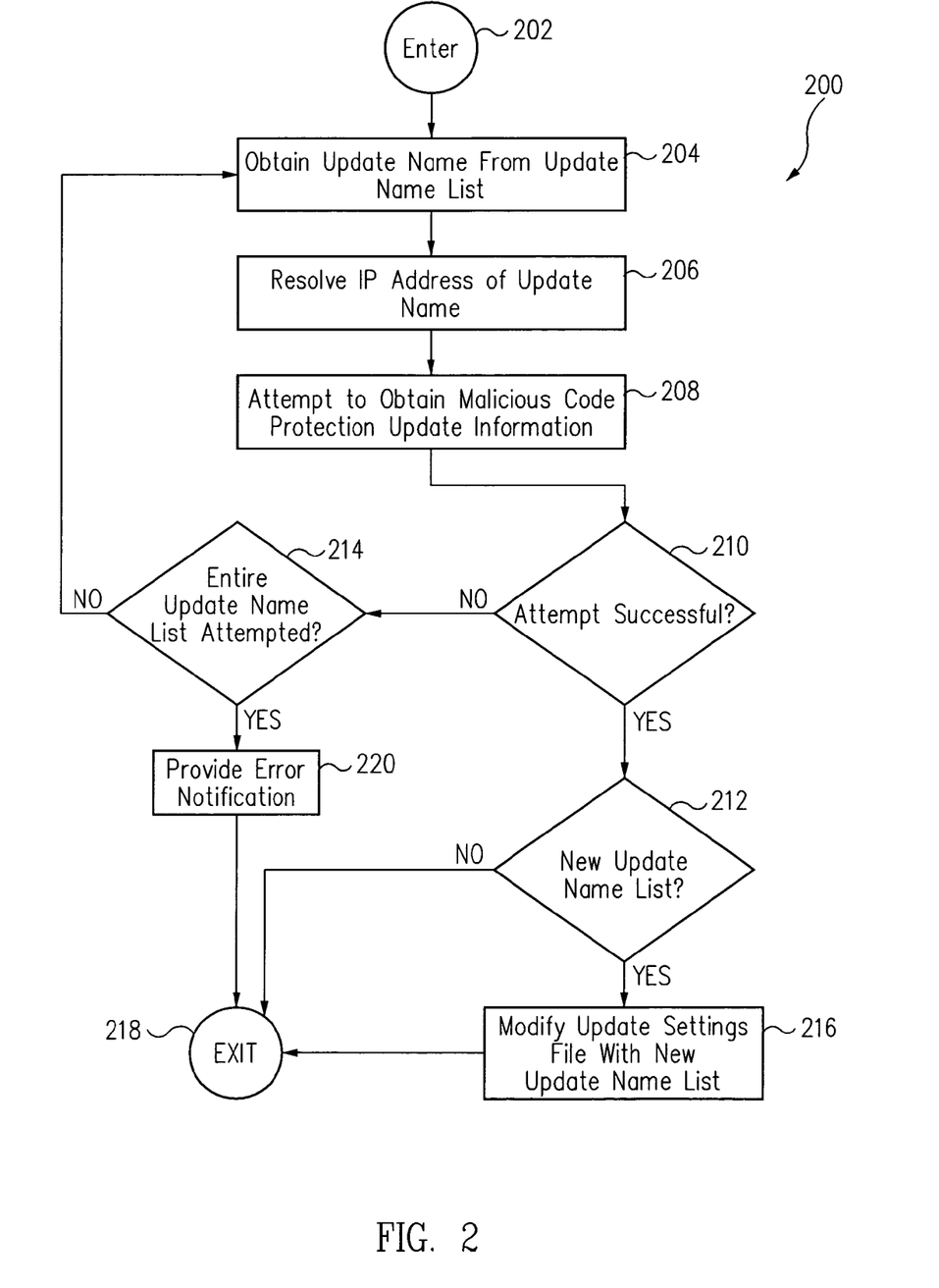
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of alternated update application 106 by processor 108 results in the operations of host computer process 200 as described below in one embodiment.

From an ENTER OPERATION 202, flow moves to an OBTAIN UPDATE NAME FROM UPDATE NAME LIST OPERATION 204. In OBTAIN UPDATE NAME FROM UPDATE NAME LIST OPERATION 204, an update name from an update name list, e.g., of update settings file 140, is obtained. Illustratively, update settings file 140 includes a list of update names, sometimes called an update name list, e.g., at least two update names. A first update name from the list of update names is selected, randomly or in order, in OBTAIN UPDATE NAME FROM UPDATE NAME LIST OPERATION 204.

From OBTAIN UPDATE NAME FROM UPDATE NAME LIST OPERATION 204, flow moves to a RESOLVE IP ADDRESS OF UPDATE NAME OPERATION 206. In RESOLVE IP ADDRESS OF UPDATE NAME OPERATION 206, the IP address of the update name obtained in OBTAIN UPDATE NAME FROM UPDATE NAME LIST OPERATION 204 is resolved. Illustratively, a DNS query is sent to DNS server computer system 150 to resolve the IP address of the update name. If successfully resolved, DNS server computer system 150 returns the IP address associated with the update name to host computer system 102.

From RESOLVE IP ADDRESS OF UPDATE NAME OPERATION 206, flow moves to an ATTEMPT TO OBTAIN MALICIOUS CODE PROTECTION UPDATE INFORMATION OPERATION 208. In ATTEMPT TO OBTAIN MALICIOUS CODE PROTECTION UPDATE INFORMATION OPERATION 208, an attempt to obtain malicious code protection update information from the IP address resolved in RESOLVE IP ADDRESS OF UPDATE NAME OPERATION 206 is made. Although attempts to obtain malicious code protection update information from IP addresses are discussed herein, in light of this disclosure, those of skill in the art will understand this to include attempts to obtain malicious code protection update information from computer systems specified by (located at) the IP addresses.

In accordance with one embodiment, malicious code protection update information includes at least one update name, e.g., an update name or a list of update names. In another embodiment, the malicious code protection update information further includes other information used by security applications, for example, includes virus definitions.

From ATTEMPT TO OBTAIN MALICIOUS CODE PROTECTION UPDATE INFORMATION OPERATION 208, flow moves to an ATTEMPT SUCCESSFUL CHECK OPERATION 210. In ATTEMPT SUCCESSFUL CHECK OPERATION 210, a determination is made as to whether the attempt to obtain malicious code protection update information in ATTEMPT TO OBTAIN MALICIOUS CODE PROTECTION UPDATE INFORMATION OPERATION 208 is successful.

If a determination is made that the attempt to obtain malicious code protection update information is successful, flow moves from ATTEMPT SUCCESSFUL CHECK OPERATION 210 to a NEW UPDATE NAME LIST CHECK OPERATION 212. Conversely, if a determination is made that the attempt to obtain malicious code protection update information is unsuccessful, flow moves from ATTEMPT SUCCESSFUL CHECK OPERATION 210 to an ENTIRE UPDATE NAME LIST ATTEMPTED CHECK OPERATION 214.

In one embodiment, if the malicious code protection update information is obtained, sometimes called retrieved or downloaded, a determination is made that the attempt to obtain malicious code protection update information is successful in ATTEMPT SUCCESSFUL CHECK OPERATION 210.

In another embodiment, if both the malicious code protection update information is obtained and the signature of the sender of the malicious code protection update information, e.g., malicious code protection update information server computer system 160, matches the signature stored on host computer system 102, e.g., part of malicious code protection information 142, a determination is made that the attempt to obtain malicious code protection update information is successful in ATTEMPT SUCCESSFUL CHECK OPERATION 210. In accordance with this embodiment, if the malicious code protection update information is not obtained or if the signature does not match, a determination is made that the attempt to obtain malicious code protection update information is unsuccessful in ATTEMPT SUCCESSFUL CHECK OPERATION 210.

Thus, if a determination is made that the attempt to obtain malicious code protection update information is successful, flow moves from ATTEMPT SUCCESSFUL CHECK OPERATION 210 to NEW UPDATE NAME LIST CHECK OPERATION 212. In NEW UPDATE NAME LIST CHECK OPERATION 212, a determination is made as to whether the malicious code protection update information obtained includes a new update name list.

If the malicious code protection update information obtained includes a new update name list, flow moves from NEW UPDATE NAME LIST CHECK OPERATION 212 to a MODIFY UPDATE SETTINGS FILE WITH NEW UPDATE NAME LIST OPERATION 216. Conversely, if the malicious code protection update information obtained does not include a new update name list, e.g., only includes virus definitions, flow moves from NEW UPDATE NAME LIST CHECK OPERATION 212 to an EXIT OPERATION 218, and exits.

Accordingly, if the malicious code protection update information includes a new update name list, flow moves to MODIFY UPDATE SETTINGS FILE WITH NEW UPDATE NAME LIST OPERATION 216. In MODIFY UPDATE SETTINGS FILE WITH NEW UPDATE NAME LIST OPERATION 216, the update settings file is modified with the new update name list included with the downloaded malicious code protection update information. More generally, the update settings are updated with the downloaded malicious code protection update information.

The new update name list is used subsequently in obtaining malicious code protection update information. Specifically, upon the next occurrence of the performance of host computer process 200, this new update name list is used. For example, an update name is obtained from the new update name list in OBTAIN UPDATE NAME FROM UPDATE NAME LIST OPERATION 204 the next time host computer process 200 is performed.

Returning again to ATTEMPT SUCCESSFUL CHECK OPERATION 210, if a determination is made that the attempt is unsuccessful, flow moves to ENTIRE UPDATE NAME LIST ATTEMPTED CHECK OPERATION 214. In ENTIRE UPDATE NAME LIST ATTEMPTED CHECK OPERATION 214, a determination is made as to whether the entire update name list has been attempted.

If an attempt to obtain malicious code protection update information from every update name on the update name list has been unsuccessfully made, a determination is made that the entire update name list has been attempted. Conversely, if an attempt to obtain malicious code protection update information has not been made from at least one update name on the update name list, a determination is made that the entire update name list has not been attempted.

Although attempts to obtain malicious code protection update information from update names is set forth herein, in light of this disclosure, those of skill in the art will understand this to include attempts to obtain malicious code protection update information from computer systems specified by (located at) IP addresses associated with the update names.

If a determination is made that the entire update name list has been attempted, flow moves from ENTIRE UPDATE NAME LIST ATTEMPTED CHECK OPERATION 214 to a PROVIDE ERROR NOTIFICATION OPERATION 220. Conversely, if a determination is made that the entire update name list has not been attempted, flow returns from ENTIRE UPDATE NAME LIST ATTEMPTED CHECK OPERATION 214 to OBTAIN UPDATE NAME FROM UPDATE NAME LIST OPERATION 204.

Accordingly, if an attempt to obtain malicious code protection update information has been made from every update name on the update name list, an error notification is provided in PROVIDE ERROR NOTIFICATION OPERATION 220. In this event, a notification is provided, e.g., to a user of host computer system 102 and/or administrator, that the malicious code protection update information is unobtainable.

However, if an attempt to obtain malicious code protection update information has not been made from at least one update name on the update name list, an unattempted update name is selected from the update name list in OBTAIN UPDATE NAME FROM UPDATE NAME LIST OPERATION 204. In accordance with one embodiment, an unattempted update name is an update name on the update name list from which an attempt to obtain malicious code protection update information has not been made.

Operations 206, 208, 210 and 214 are repeated for each unattempted update name until a determination is made that the attempt was successful in ATTEMPT SUCCESSFUL CHECK OPERATION 210 or a determination is made that the entire update name list has been attempted in ENTIRE UPDATE NAME LIST ATTEMPTED CHECK OPERATION 214.

To illustrate, in one embodiment, the update name list consists of a first update name and a second update name. If a determination is made that the attempt to obtain malicious code protection update information from the first update name is unsuccessful in ATTEMPT SUCCESSFUL CHECK OPERATION 210, and a determination is made that an attempt to obtain malicious code protection update information from the second update name has not been made in ENTIRE UPDATE NAME LIST ATTEMPTED CHECK OPERATION 214, flow moves to OBTAIN UPDATE NAME FROM UPDATE NAME LIST OPERATION 204.

In accordance with this embodiment, the second update name is selected from the update name list. Operations 206, 208 are performed on the second update name in a manner similar to that discussed above. Upon a determination that the attempt to obtain malicious code protection update information from the second update name is unsuccessful in ATTEMPT SUCCESSFUL CHECK OPERATION 210, a determination is made that the entire update name list has been attempted in ENTIRE UPDATE NAME LIST ATTEMPTED CHECK OPERATION 214, and an error notification is provided in PROVIDE ERROR NOTIFICATION OPERATION 220. From PROVIDE ERROR NOTIFICATION OPERATION 220, flow moves to and exits at EXIT OPERATION 218.

In one embodiment, an amount of time, sometimes called a delay, e.g., 10 to 30 minutes, is caused between successive attempts to obtain malicious code protection update information. Stated another way, after performance of ATTEMPT TO OBTAIN MALICIOUS CODE PROTECTION UPDATE INFORMATION OPERATION 208, a delay, e.g., 10 to 30 minutes, is required before ATTEMPT TO OBTAIN MALICIOUS CODE PROTECTION UPDATE INFORMATION OPERATION 208 is performed again.

FIG. 3 is a flow diagram of a malicious code protection update information server computer process 300 in accordance with one embodiment of the present invention. Referring now to FIGS. 1 and 3 together, malicious code protection update information server computer system 160, sometimes called server computer system 160, includes an alternate update server application 162. Execution of alternated update server application 162 by a processor of server computer system 160 results in the operations of process 300 as described below in one embodiment.

From an ENTER OPERATION 302, flow moves to a GENERATE NEW UPDATE NAME LIST(S) OPERATION 304. In GENERATE NEW UPDATE NAME LIST(S) OPERATION 304, a new update name list (or lists) is generated.

Illustratively, domain names are registered, e.g., periodically such as monthly. These domain names are used to identify the IP address of server computer system 160. These domain names are used by host computer systems such as host computer system 102 to update malicious code protection information on the host computer systems. Accordingly, these domain names are sometimes called update names.

Although server computer system 160 is illustrated and discussed herein as a single computer system, in light of this disclosure, those of skill in the art will understand that instead of a single server computer system 160, a plurality of server computer systems can be used depending upon the usage requirements, e.g., number of downloads.

Accordingly, in GENERATE NEW UPDATE NAME LIST(S) OPERATION 304, a new update name list (or lists) is generated from the registered domain names. Further, the new update name list (or lists) can be bundled with other malicious code protection update information, e.g., new virus definitions, in GENERATE NEW UPDATE NAME LIST(S) OPERATION 304.

From GENERATE NEW UPDATE NAME LIST(S) OPERATION 304, flow moves to a PROVIDE MALICIOUS CODE PROTECTION UPDATE INFORMATION OPERATION 306. In PROVIDE MALICIOUS CODE PROTECTION UPDATE INFORMATION OPERATION 306, the malicious code protection update information generated in GENERATE NEW UPDATE NAME LIST(S) OPERATION 304 is provided to a host computer system (or systems) such as host computer system 102. Illustratively, referring to FIGS. 2 and 3 together, the malicious code protection update information is provided in response to the attempt to obtain malicious code protection update information in ATTEMPT TO OBTAIN MALICIOUS CODE PROTECTION UPDATE INFORMATION OPERATION 208. From PROVIDE MALICIOUS CODE PROTECTION UPDATE INFORMATION OPERATION 306, flow moves to and exits at an EXIT OPERATION 308.

In accordance with one embodiment, only a subset of the registered domain names are used to create the update name list provided to any one host computer system. Each subset is randomly or otherwise selected. Accordingly, each host computer system will be updated with a different update name list.

Thus, even if malicious code compromises a first host computer system and propagates to a second host computer system, the second host computer system will still be able to obtain updates because update names not present on the first computer system are used. More generally, a malicious code creator will not be able to determine all of the update names, but at most, a subset of the update names.

In another embodiment, subsets of the registered domain names are used to make a plurality of different update name lists. These different update name lists are distributed, e.g., randomly, to the host computer systems. For example, only a small percentage, e.g., 10%, of host computer systems will receive the identical update name list.

Further, instead of distributing the different update name lists randomly, the update name lists are distributed based on the country in which the host computer system is located. For example, there is a malicious code protection update information server computer system in each country and a host computer in a particular country gets an update name list with the IP address of the malicious code protection update information server computer system also located in that same country.

In one embodiment, the malicious code protection update information is provided in encrypted form. For example, alternated update application 106 of host computer system 102 includes a key used to decrypt the malicious code protection update information. By encrypting the malicious code protection update information, the new update name list is obscured from malicious code on host computer system 102, or at least made more difficult to obtain.

In accordance with one embodiment, new domain names are registered and new update name lists from these domain names are periodically created and distributed. In this manner, the ability of malicious code to successfully block access to security vendor sites is restricted or defeated. Specifically, instead of using consistent and hard coded update names, examples of which are provided below, which malicious code (or a malicious code creator) can readily discover and maliciously enter into the hosts file to redirect the host computer system back to itself, the update names are periodically changed. This essentially eliminates the ability of the malicious code to block a host computer system from accessing and downloading updates from security vendor sites, e.g., server computer system 160.

Figure 4:
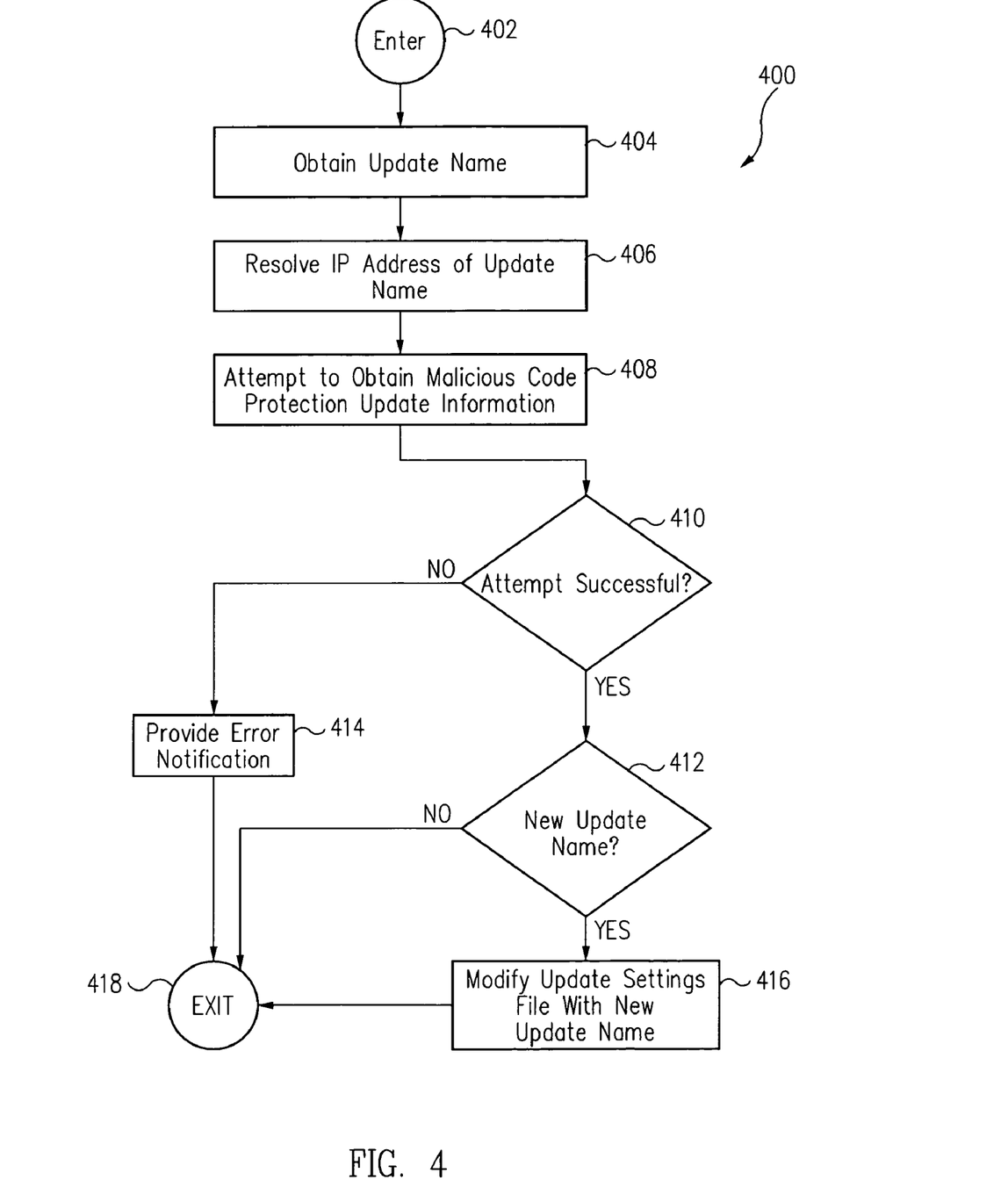
FIG. 4 is a flow diagram of a host computer process in accordance with another embodiment of the invention.

Below is a listing on the names placed by W32.HLLW.Polybot in the hosts file:

127.0.0.1 www.symantec.com 127.0.0.1 securityresponse.symantec.com 127.0.0.1 symantec.com 127.0.0.1 www.sophos.com 127.0.0.1 sophos.com 127.0.0.1 sophos.com 127.0.0.1 www.mcafee.com 127.0.0.1 mcafee.com 127.0.0.1 liveupdate.symantecliveupdate.com 127.0.0.1 www.viruslist.com 127.0.0.1 viruslist.com 127.0.0.1 viruslist.com 127.0.0.1 f-secure.com 127.0.0.1 www.f-secure.com 127.0.0.1 kaspersky.com 127.0.0.1 www.avp.com 127.0.0.1 www.kaspersky.com 127.0.0.1 avp.com 127.0.0.1 www.networkassociates.com 127.0.0.1 networkassociates.com 127.0.0.1 www.ca.com 127.0.0.1 ca.com 127.0.0.1 mast.mcafee.com 127.0.0.1 my-etrust.com 127.0.0.1 www.my-etrust.com
127.0.0.1 download.mcafee.com
127.0.0.1 dispatch.mcafee.com
127.0.0.1 secure.nai.com
127.0.0.1 nai.com
127.0.0.1 www.nai.com
127.0.0.1 update.symantec.com
127.0.0.1 updates.symantec.com
127.0.0.1 us.mcafee.com
127.0.0.1 liveupdate.symantec.com
127.0.0.1 customer.symantec.com
127.0.0.1 rads.mcafee.com
127.0.0.1 trendmicro.com
127.0.0.1 www.trendmicro.com Below is a listing on the names placed by W32.Cone family in the hosts file:

127.0.0.1 securityresponse.symantec.com
127.0.0.1 symantec.com
127.0.0.1 www.sophos.com
127.0.0.1 sophos.com
127.0.0.1 www.mcafee.com
127.0.0.1 mcafee.com
127.0.0.1 liveupdate.symanteclivupdate.com
127.0.0.1 www.viruslist.com
127.0.0.1 viruslist.com
127.0.0.1 viruslist.com
127.0.0.1 f-secure.com
127.0.0.1 www.f-secure.com
127.0.0.1 kaspersky.com
127.0.0.1 www.avp.com
127.0.0.1 www.kaspersky.com
127.0.0.1 avp.com
127.0.0.1 www.networkassociates.com
127.0.0.1 networkassociates.com
127.0.0.1 www.ca.com
127.0.0.1 ca.com
127.0.0.1 mast.mcafee.com
127.0.0.1 my-etrust.com
127.0.0.1 www.my-etrust.com
127.0.0.1 download.mcafee.com
127.0.0.1 dispatch.mcafee.com
127.0.0.1 secure.nai.com
127.0.0.1 nai.com
127.0.0.1 www.nai.com
127.0.0.1 microsoft.com
127.0.0.1 www.microsoft.com
127.0.0.1 support.microsoft.com
127.0.0.1 update.symantec.com
127.0.0.1 updates.symantec.com
127.0.0.1 us.mcafee.com
127.0.0.1 liveupdate.symantec.com
127.0.0.1 customer.symantec.com
127.0.0.1 rads.mcafee.com
127.0.0.1 trendmicro.com
127.0.0.1 www.trendmicro.com
127.0.0.1 localhost FIG. 4 is a flow diagram of a host computer process 400 in accordance with another embodiment of the present invention. Referring now to FIGS. 1 and 4 together, execution of alternated update application 106 by processor 108 results in the operations of host computer process 400 as described below in one embodiment.

From an ENTER OPERATION 402, flow moves to an OBTAIN UPDATE NAME OPERATION 404. In OBTAIN UPDATE NAME OPERATION 404, an update name, e.g., from update settings file 140, is obtained. Illustratively, update settings file 140 includes the update name.

From OBTAIN UPDATE NAME OPERATION 404, flow moves to a RESOLVE IP ADDRESS OF UPDATE NAME OPERATION 406. In RESOLVE IP ADDRESS OF UPDATE NAME OPERATION 406, the IP address of the update name obtained in OBTAIN UPDATE NAME OPERATION 404 is resolved. Illustratively, a DNS query is sent to DNS server computer system 150 to resolve the IP address of the update name. If successfully resolved, DNS server computer system 150 returns the IP address associated with the update name to host computer system 102.

From RESOLVE IP ADDRESS OF UPDATE NAME OPERATION 406, flow moves to an ATTEMPT TO OBTAIN MALICIOUS CODE PROTECTION UPDATE INFORMATION OPERATION 408. In ATTEMPT TO OBTAIN MALICIOUS CODE PROTECTION UPDATE INFORMATION OPERATION 408, an attempt to obtain malicious code protection update information from the resolved IP address is made.

From ATTEMPT TO OBTAIN MALICIOUS CODE PROTECTION UPDATE INFORMATION OPERATION 408, flow moves to an ATTEMPT SUCCESSFUL CHECK OPERATION 410. In ATTEMPT SUCCESSFUL CHECK OPERATION 410, a determination is made as to whether the attempt to obtain malicious code protection update information in ATTEMPT TO OBTAIN MALICIOUS CODE PROTECTION UPDATE INFORMATION OPERATION 408 is successful.

If a determination is made that the attempt to obtain malicious code protection update information is successful, flow moves from ATTEMPT SUCCESSFUL CHECK OPERATION 410 to a NEW UPDATE NAME CHECK OPERATION 412. Conversely, if a determination is made that the attempt to obtain malicious code protection update information is unsuccessful, flow moves from ATTEMPT SUCCESSFUL CHECK OPERATION 410 to a PROVIDE ERROR NOTIFICATION OPERATION 414.

Thus, if a determination is made that the attempt to obtain malicious code protection update information is successful, flow moves from ATTEMPT SUCCESSFUL CHECK OPERATION 410 to NEW UPDATE NAME CHECK OPERATION 412. In NEW UPDATE NAME CHECK OPERATION 412, a determination is made as to whether the malicious code protection update information obtained includes a new update name.

If the malicious code protection update information obtained includes a new update name, flow moves from NEW UPDATE NAME CHECK OPERATION 412 to a MODIFY UPDATE SETTINGS FILE WITH NEW UPDATE NAME OPERATION 416. Conversely, if the malicious code protection update information obtained does not include a new update name, e.g., only includes virus definitions, flow moves from NEW UPDATE NAME CHECK OPERATION 412 to an EXIT OPERATION 418, and exits.

Accordingly, if the malicious code protection update information includes a new update name, flow moves to MODIFY UPDATE SETTINGS FILE WITH NEW UPDATE NAME OPERATION 416. In MODIFY UPDATE SETTINGS FILE WITH NEW UPDATE NAME OPERATION 416, the update settings file is modified with the new update name included with the downloaded malicious code protection update information.

This new update name is used subsequently in obtaining malicious code protection update information. Specifically, upon the next occurrence of the performance of host computer process 400, this new update name is used. For example, the update name is obtained in OBTAIN UPDATE NAME OPERATION 404 the next time host computer process 400 is performed.

Returning again to ATTEMPT SUCCESSFUL CHECK OPERATION 410, if a determination is made that the attempt is unsuccessful, flow moves to PROVIDE ERROR NOTIFICATION OPERATION 414. In PROVIDE ERROR NOTIFICATION OPERATION 414, an error notification is provided. For example, a notification is provided, e.g., to a user of host computer system 102 and/or administrator, that the malicious code protection update information is unobtainable. From PROVIDE ERROR NOTIFICATION OPERATION 414, flow moves to and exits at EXIT OPERATION 418.

Figure 5:
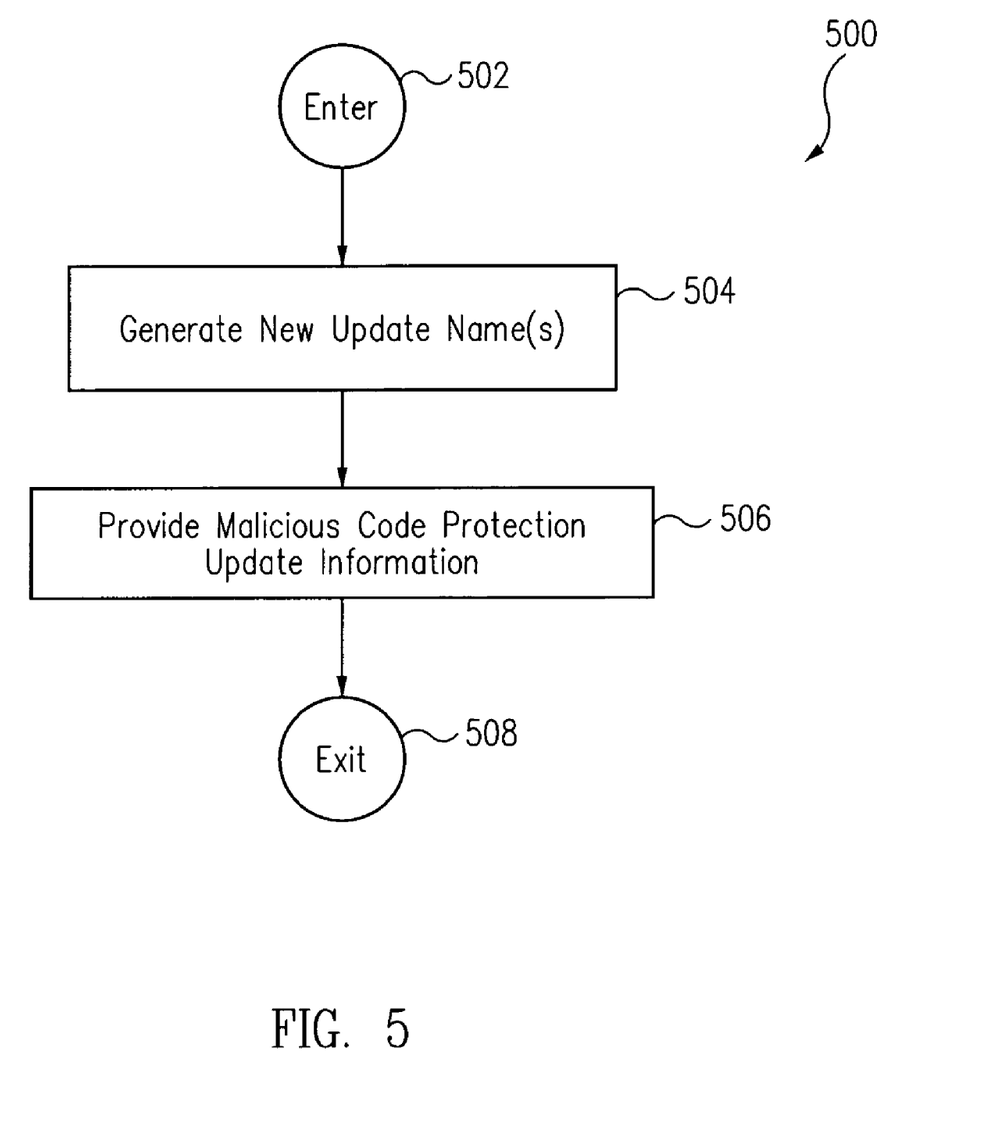
FIG. 5 is a flow diagram of a malicious code protection update information server computer process in accordance with another embodiment of the present invention.

FIG. 5 is a flow diagram of a malicious code protection update information server computer process 500 in accordance with another embodiment of the present invention. Referring now to FIGS. 1 and 5 together, execution of alternated update server application 162 by a processor of server computer system 160 results in the operations of process 500 as described below in one embodiment.

From an ENTER OPERATION 502, flow moves to a GENERATE NEW UPDATE NAME(S) OPERATION 504. In GENERATE NEW UPDATE NAME(S) OPERATION 504, a new update name (or names) is generated.

Illustratively, domain names are periodically registered and a new update name is generated from the registered domain names, e.g., a domain name is selected as the update name. Further, the new update name can be bundled with other malicious code protection update information, e.g., new virus definitions, in GENERATE NEW UPDATE NAME(S) OPERATION 504.

From GENERATE NEW UPDATE NAME(S) OPERATION 504, flow moves to a PROVIDE MALICIOUS CODE PROTECTION UPDATE INFORMATION OPERATION 506. In PROVIDE MALICIOUS CODE PROTECTION UPDATE INFORMATION OPERATION 506, the malicious code protection update information generated in GENERATE NEW UPDATE NAME(S) OPERATION 504 is provided to a host computer systems such as host computer system 102. Illustratively, referring to FIGS. 4 and 5 together, the malicious code protection update information is provided in response to the attempt to obtain malicious code protection update information in ATTEMPT, TO OBTAIN MALICIOUS CODE PROTECTION UPDATE INFORMATION OPERATION 408. From PROVIDE MALICIOUS CODE PROTECTION UPDATE INFORMATION OPERATION 506, flow moves to and exits at an EXIT OPERATION 508.

In accordance with one embodiment, a domain name is randomly or otherwise selected as the update name. Accordingly, each host computer system will be updated with a different update name.

Thus, even if malicious code compromises a first host computer system and propagates to a second host computer system, the second host computer system will still be able to obtain updates because an update name not present on the first computer system is used. More generally, a malicious code creator will not be able to determine all of the update names, but at most, a subset of the update names.

In another embodiment, only specified host computer systems, e.g., 10% of host computer systems, will receive the identical update name. Further, instead of distributing the different update names randomly, the update names are distributed based on the country in which the host computer system is located. For example, there is a malicious code protection update information server computer system in each country and a host computer in a particular country gets an update name with the IP address of the malicious code protection update information server computer system also located in that same country.

In accordance with one embodiment, new domain names are registered and new update names from these domain names are periodically created and distributed. In this manner, the ability of malicious code to successfully block access to security vendor sites is restricted or defeated. Specifically, instead of using consistent and hard coded update names that malicious code (or a malicious code creator) can readily discover and maliciously enter into the hosts file to redirect the host computer system back to itself, the update names are periodically changed. This essentially eliminates the ability of the malicious code to block a host computer system from accessing and downloading updates from security vendor sites, e.g., server computer system 160.

Referring again to FIG. 1, alternated update application 106 is in computer memory 114. As used herein, a computer memory refers to a volatile memory, a non-volatile memory, or a combination of the two.

Although alternated update application 106 and alternated update server application 162 are referred to as applications, this is illustrative only. Alternated update application 106 and alternated update server application 162 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs (CDs), DVDs, ROM cards, floppy discs, magnetic tapes, computer hard drives, and servers on a network.

As illustrated in FIG. 1, this medium may belong to the computer system itself. However, the medium also may be removed from the computer system. For example, alternated update application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the alternated update functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the alternated update functionality in accordance with one embodiment of the present invention can be implemented in a wide variety of computer system configurations. In addition, the alternated update functionality could be stored as different modules in memories of different devices. For example, alternated update application 106 could initially be stored in server computer system 130, and then as necessary, a portion of alternated update application 106 could be transferred to host computer system 102 and executed on host computer system 102. Consequently, part of the alternated update functionality would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, alternated update application 106 is stored in memory 136 of server computer system 130. Alternated update application 106 is transferred over network 126 to memory 114 in host computer system 102. In this embodiment, network interface 138 and I/O interface 110 would include analog modems, digital modems, or a network interface card. If modems are used, network 126 includes a communications network, and alternated update application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
  generating a plurality of different update name lists comprising:
    registering domain names of sites from which malicious code protection update information can be obtained; and
    selecting subsets of said registered domain names to create said different update names lists, each of said different update name lists comprising a subset of said registered domain names that is different than subsets of said registered domain names of the other of said different update name lists; and
  providing said malicious code protection update information including said different update name lists to host computer systems, wherein different ones of said host computer systems receive different ones of said different update names lists, said malicious code protection update information for use by security applications of said host computer systems to detect malicious code on said host computer systems.

2. The method of claim 1 further comprising:
  obtaining said malicious code protection update information including a new update name list, said new update name list being one of said different update name lists;
  determining whether said malicious code protection update information includes said new update name list; and
  modifying update settings of malicious code protection information with said new update name list.

3. The method of claim 2 wherein said malicious code protection information comprises outdated virus definitions and wherein said malicious code protection update information includes updated virus definitions, said method further comprising:
  replacing said outdated virus definitions with said updated virus definitions; and
  using said updated virus definitions with said security application on a host computer system to detect said malicious code on said host computer system.

4. The method of claim 2 wherein said update settings comprise settings for updating said malicious code protection information.

5. The method of claim 4 wherein an update settings file of said malicious code protection information comprises said update settings.

6. The method of claim 2 further comprising obtaining an update name from said new update name list.

7. The method of claim 6 further comprising resolving an IP address of said update name.

8. The method of claim 7 further comprising attempting to obtain malicious code protection update information from said IP address.

9. The method of claim 8 further comprising determining whether said attempt was successful.

10. The method of claim 9 wherein upon a determination that said attempt was not successful, said method further comprising determining whether an attempt to obtain said malicious code protection update information from every update name on said update name list has been attempted.

11. The method of claim 10 wherein upon a determination that an attempt to obtain said malicious code protection update information has not been made from at least one update name on said update name list, said method further comprising obtaining an unattempted update name from said update name list.

12. The method of claim 10 wherein upon a determination that an attempt to obtain malicious code protection update information from every update name on said update name list has been unsuccessfully made, said method further comprising providing an error notification.

13. The method of claim 1 wherein said domain names are registered periodically.

14. The method of claim 13 wherein said domain names are registered monthly.

15. The method of claim 1 wherein said domain names are used to identify the IP address of a malicious code protection update information server computer system.

16. The method of claim 1 wherein said subsets are randomly selected.

17. The method of claim 1 wherein said different update name lists are distributed randomly to said host computer systems.

18. The method of claim 1 wherein said different update name lists are distributed based on a country in which a host computer system is located.

19. The method of claim 1 wherein said malicious code protection update information is provided in encrypted form.

20. The method of claim 1 further comprising:
obtaining an update name from an update name list;
resolving an IP address of said update name;
obtaining said malicious code protection update information from a server computer system located at said IP address, said malicious code protection update information including a new update name list, said new update name list being one of said different update name lists; and
modifying update settings with said new update name list.

21. A system comprising:
a means for generating a plurality of different update name lists comprising:
a means for registering domain names of sites from which malicious code protection update information can be obtained; and
a means for selecting subsets of said registered domain names to create said different update names lists, each of said different update name lists comprising a subset of said registered domain names that is different than subsets of said registered domain names of the other of said different update name lists; and
a means for providing said malicious code protection update information including said different update name lists to host computer systems, wherein different ones of said host computer systems receive different ones of said different update names lists, said malicious code protection update information for use by security applications of said host computer systems to detect malicious code on said host computer systems;
a means for obtaining said malicious code protection update information including a new update name list, said new update name list being one of said different update name lists;
a means for determining whether said malicious code protection update information includes said new update name list; and
a means for modifying update settings of malicious code protection information with said new update name list.

22. A computer-program product comprising a computer readable storage medium containing computer program code comprising:

an alternated update application for generating a plurality of different update name lists comprising:
registering domain names of sites from which malicious code protection update information can be obtained; and
selecting subsets of said registered domain names to create said different update names lists, each of said different update name lists comprising a subset of said registered domain names that is different than subsets of said registered domain names of the other of said different update name lists; and
said alternated update application further for providing said malicious code protection update information including said different update name lists to host computer systems, wherein different ones of said host computer systems receive different ones of said different update names lists, said malicious code protection update information for use by security applications of said host computer systems to detect malicious code on said host computer systems;
said alternated update application further for obtaining said malicious code protection update information including a new update name list, said new update name list being one of said different update name lists;
said alternated update application further for determining whether said malicious code protection update information includes said new update name list; and
said alternated update application further for modifying update settings of malicious code protection information with said new update name list.

23. A computer system comprising:
a memory having stored therein an alternated update application; and
a processor coupled to said memory, wherein execution of said alternated update application generates a method comprising:
generating a plurality of different update name lists comprising:
registering domain names of sites from which malicious code protection update information can be obtained; and
selecting subsets of said registered domain names to create said different update names lists, each of said different update name lists comprising a subset of said registered domain names that is different than subsets of said registered domain names of the other of said different update name lists; and
providing said malicious code protection update information including said different update name lists to host computer systems, wherein different ones of said host computer systems receive different ones of said different update names lists, said malicious code protection update information for use by security applications of said host computer systems to detect malicious code on said host computer systems.

* * * * *